(12) United States Patent
Haran

(10) Patent No.: US 6,731,733 B2
(45) Date of Patent: May 4, 2004

(54) SYSTEM AND METHOD PROTECTING THE IDENTITY OF TARGET TELEPHONE NUMBERS FROM UNAUTHORIZED ACCESS

(75) Inventor: Dan Haran, Medford, NJ (US)

(73) Assignee: Comverse, Inc., Wakefield, MA (US)

( * ) Notice: Subject to any disclaimer, the term of this patent is extended or adjusted under 35 U.S.C. 154(b) by 473 days.

(21) Appl. No.: 09/903,859

(22) Filed: Jul. 13, 2001

(65) Prior Publication Data

US 2003/0012355 A1 Jan. 16, 2003

(51) Int. Cl.[7] .............................................. H04M 3/42
(52) U.S. Cl. ............................. 379/201.11; 379/32.05; 379/35
(58) Field of Search .............................. 379/32.05, 35, 379/34, 309, 201.11

(56) References Cited

U.S. PATENT DOCUMENTS

| | | | |
|---|---|---|---|
| 5,351,287 A | 9/1994 | Bhattacharyya | 379/93.02 |
| 5,832,057 A | 11/1998 | Furman | 379/7 |
| 5,923,744 A | 7/1999 | Cheng | 379/221.09 |
| 5,930,698 A | 7/1999 | Bertacchi | 455/405 |
| 5,956,717 A | 9/1999 | Kraay et al. | 707/10 |
| 6,078,648 A | 6/2000 | Albers et al. | 379/35 |
| 6,097,798 A | 8/2000 | Albers et al. | 379/114.28 |
| 6,122,499 A | 9/2000 | Magnusson | 455/405 |

FOREIGN PATENT DOCUMENTS

| | | | |
|---|---|---|---|
| WO | WO 99/14970 | 9/1998 | H04Q/7/20 |
| WO | WO 99/39492 | 1/1999 | H04Q/7/20 |

*Primary Examiner*—Ahmad F. Matar
*Assistant Examiner*—Sadiki Mwanyoha
(74) *Attorney, Agent, or Firm*—Staas & Halsey LLP (57) ABSTRACT

A system and method to protect a target telephone number from unauthorized access includes a first one-way encoding unit to encode the target telephone number using nonreversible encoding. A storage unit stores the encoded target telephone number. A second one-way encoding unit encodes a calling telephone number and a receiving telephone number using the non-reversible encoding. A comparing unit determines whether the stored encoded target telephone number matches the encoded calling telephone number and/or the receiving telephone number and routing a call between the calling telephone number and the receiving telephone number matching the target telephone number to a monitoring unit. The monitoring unit monitors and/or records the call and connects the calling telephone number to the receiving telephone number.

12 Claims, 4 Drawing Sheets

SYSTEM AND METHOD PROTECTING THE IDENTITY OF TARGET TELEPHONE NUMBERS FROM UNAUTHORIZED ACCESS

BACKGROUND OF THE INVENTION

1. Field of the Invention

The present invention is directed to a system and method for protecting the identity of target telephone numbers being monitored by law enforcement agencies from unauthorized access.

2. Description of the Related Art

When law enforcement agencies monitor telephone calls to obtain evidence for use in criminal investigations, it is important to protect the identity of telephone numbers being monitored, known as target telephone numbers, from unauthorized access.

In order to monitor and/or record these telephone calls, it is necessary to route the telephone calls to a monitoring system, such as a Comverse InfoSys system, e.g., an Ultra monitoring system manufactured by Comverse InfoSys of Woodbury, N.Y., where such monitoring and/or recording can take place. That requires that network elements such as switches or SCPs (i.e., service control points) identify the target telephone numbers prior to routing the calls from these target telephone numbers to the monitoring system and subsequently to their destination. Because the network elements typically handle and route thousands of calling telephone numbers to receiving telephone numbers, identifying the target telephone numbers can be challenging.

In a conventional telephone call monitoring system, a calling telephone number would dial into a network. The network then routes the calling telephone number to the receiving telephone number. Commercial software packages are currently available in the market allowing the network operators to specify predetermined numbers in the network switches, such that calls made by or to these numbers will be routed to the law enforcement agency monitoring system.

However, often times, unauthorized users may gain access to these predetermined numbers stored on the network switches and thus learn which telephone numbers are being monitored (known as "targets") by law enforcement agencies. Conventional methods allow switch maintenance personnel to provision and view these predetermined numbers on the network switches. In addition, switch maintenance and operation personnel may gain access to the Call Detail Records (CDR) generated by network switches, and learn from them about calls that have been specially redirected to the law enforcement monitoring system. Such access by unauthorized users jeopardizes the effectiveness of any telephone call monitoring and/or recording by law enforcement agencies. It is desired to prevent unauthorized users to access the identity of the target telephone numbers.

SUMMARY OF THE INVENTION

The present system and method prevents unauthorized access of target telephone numbers that a law enforcement agency wishes to monitor by encoding the target telephone numbers using a one-way encoding algorithm, prior to storing these target numbers in the network elements.

The present invention has been made to overcome the above-mentioned problems of the related art, and accordingly, the present invention provides a system and method to protect a target telephone number from unauthorized access, including a first one-way encoding unit encoding a target telephone number using non-reversible encoding; a storage unit storing the encoded target telephone number; a second one-way encoding unit encoding a calling telephone number and a receiving telephone number using the non-reversible encoding; a monitoring unit; and a comparing unit determining whether the stored encoded target telephone number matches the encoded calling telephone number and/or the receiving telephone number and routing a call between the calling telephone number and the receiving telephone number matching the target telephone number to the monitoring unit, wherein the monitoring unit monitors and/or records the call and connects the calling telephone number to the receiving telephone number.

The present invention further provides a system and method including a first one-way encoding unit encoding the target telephone number using non-reversible encoding; a storage unit storing the encoded target telephone number; a second one-way encoding unit encoding a calling telephone number and a receiving telephone number using the non-reversible encoding; a monitoring unit; and a comparing unit comparing the stored encoded target telephone number with the encoded calling telephone number and the receiving telephone number, determining therefrom whether the stored encoded target telephone number matches the encoded calling telephone number and/or the encoded receiving telephone number, routing a real target call between the calling telephone number and the receiving telephone number matching the target telephone number to the monitoring unit, and routing a false target call between the calling telephone number and the receiving telephone number not matching the target telephone number to the monitoring unit, wherein the monitoring unit filters the false target call from the real target call and monitors and/or records the real target call.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE PREFERRED EMBODIMENT

The present system and method prevents unauthorized access of target telephone numbers by encoding the target telephone numbers using a one-way encoding algorithm. The one-way encoding algorithm encodes the target telephone numbers using a code so as to be unintelligible to any users. The one-way encoding algorithm is a non-reversible algorithm; that is, the encoded target telephone number does not include enough information that can be used to obtain the original telephone number thereby protecting the target telephone numbers from unauthorized users. One-way encoding algorithms are currently in use in prepaid systems where recharge voucher numbers are stored in a fraud-proof manner.

Network elements, such as switches or SCPs, store the encoded target telephone numbers rather than storing the actual target telephone number. The network element also includes the one-way encoding algorithm to encode a calling telephone number and a receiving telephone number. The network element then routes the call (i.e., "real target") if the encoded calling telephone number and/or receiving telephone number match the stored encoded target telephone number to a monitoring device for monitoring and/or recording. The monitoring device is under the custody of the law enforcement agency.

In addition, in the event that the encoded calling and/or receiving telephone numbers do not match the stored encoded target telephone number, the present system and method may choose to route the call to the monitoring device as a "false target" to conceal the real targets. Specifically, the system randomly routes to the monitoring device calls where the encoded calling telephone number and/or the receiving telephone number did not match the stored encoded target telephone number and, thus, are not intended to be target telephone numbers. The monitoring device is programmed to filter the false target calls and retrieve therefrom the real target calls. Thus, the system and method make it impossible to accurately determine which numbers represent real targets and which numbers are false targets by looking at the way the network routes calls to the monitoring device, as can be determined from CDR analysis at the network.

An example of a conventional one-way or non-reversible encoding algorithm is RSA Data Security, Inc., "MD5 Message-Digest Algorithm," (April 1992) available in public domain http://www.cis.ohio-state.edu/htbin/rfc/rfc1321.html, the content of which is hereby incorporated by reference. This text in its entirety provides a general description of the one-way encoding algorithm precluding decoding or decryption of an encoded message.

Figure 1:
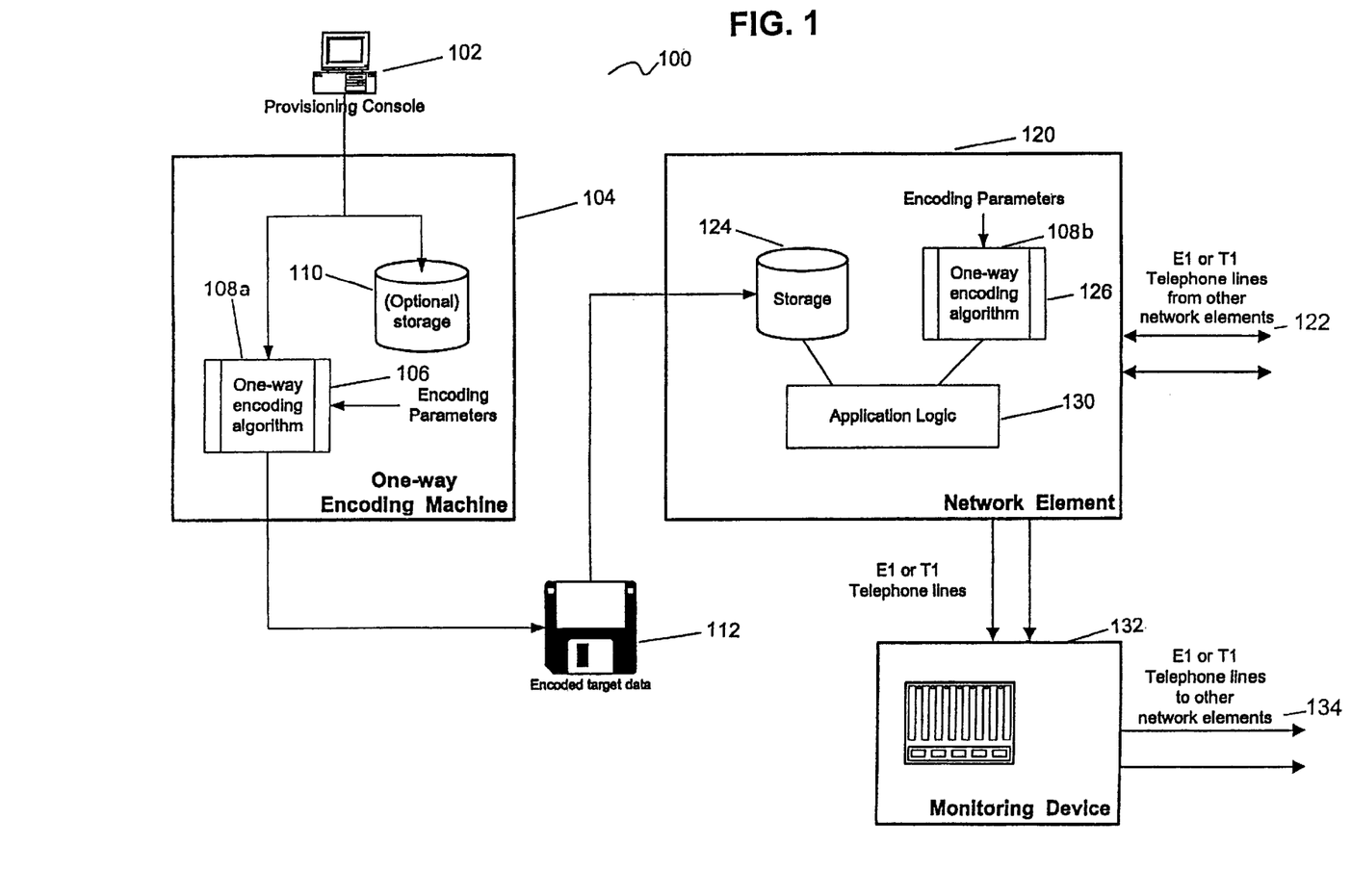
FIG. 1 is a diagram of a telephone monitoring system including a one-way encoding algorithm to protect the identity of target telephone numbers, in accordance with an exemplary embodiment of the present invention.

FIG. 1 illustrates a diagram of a telephone monitoring system 100 including the one-way encoding algorithm to protect the identity of target telephone numbers, in accordance with an exemplary embodiment of the present invention. The enforcement agency enters the target telephone numbers via a provisioning console 102, such as a personal computer. The provisioning console 102 downloads the target telephone numbers to a one-way encoding machine 104. The one-way encoding machine 104 includes a first one-way encoding unit 106, such as a processor including the one-way encoding algorithm 108a, and an optional storage unit 110, which acts as a storage means or unit. The one-way encoding algorithm 108a encodes the target telephone number entered from the provisioning console 102. The first-one way encoding unit 106 acts as a one-way encoding means and also includes permanent or removable storage, such as magnetic and optical discs, RAM, ROM, etc. on which the process and data structures of the present invention can be stored and distributed. The storage unit 110, if provided, stores the target telephone numbers prior to being encoded. The provisioning console 102 and the one-way encoding machine 104 are under the custody of the law enforcement agency.

Encoded target data 112, which includes the encoded target telephone numbers, is transferred to a network element 120 (i.e., switch, SCP, etc.). The one-way encoding machine 104 may either transfer the encoded target data 112 directly to the network element 120 or download the encoded target data 112 to the network element 120 via a floppy disk or any other similar device.

The network element 120 includes a storage unit 124, a second one-way encoding unit 126, such as a processor including the one-way encoding algorithm 108b, and an application logic unit 130. The storage unit 124, which acts as a storage means or unit, stores the encoded target data 112. The second-one way encoding unit 126 acts as a one-way encoding means and also includes permanent or removable storage, such as magnetic and optical discs, RAM, ROM, etc. on which the process and data structures of the present invention can be stored and distributed. During operation, the network element 120 is connected to other network elements 122 and calls from the calling telephone number and to the receiving telephone number reach the network element 120. The second one-way encoding unit 126 receives and encodes the calling telephone number and the receiving telephone number using the one-way encoding algorithm 108b. To encode the calling and the receiving telephone numbers, the one-way encoding algorithm 108b employs the same encoding parameters as the one-way encoding algorithm 108a in the one-way encoding machine 104 used to encode the target telephone numbers.

Once the calling telephone number and the receiving telephone number are encoded, the application logic unit 130, which acts as a comparing unit or means, compares and determines whether the encoded calling telephone number and/or the encoded receiving telephone number match the encoded target data 112. If the application logic unit 130 determines that there is a match, that indicates that the particular call between the encoded calling telephone number and/or the encoded receiving telephone number is to be monitored. If there is a match, the application logic unit 130 directs the network element 120 to transfer or route the call between the calling telephone number and the receiving telephone number matching the encoded target data 112 (i.e., the target telephone numbers) to a monitoring device 132, which acts as a monitoring means or unit.

The monitoring device 132 is a secured unit that is under the control of the law enforcement agency. At the monitoring device 132, the call from the calling telephone number is routed to its destination 134, that is, to the receiving telephone number and the law enforcement agency begins the monitoring and/or recording of the telephone call.

The application logic unit 130 may also perform a spoofing process by randomly transmitting false target calls to the monitoring device 132. Specifically, the application logic unit 130 randomly transmits to the monitoring device 132 calls from calling telephone numbers to receiving telephone numbers that did not match the encoded target telephone numbers with the stored encoded target data 112. The purpose of the spoofing process is to mislead the unauthorized user attempting to access or to identify the information of calls being transmitted or routed from the network element 120 to the monitoring device 132. In turn, the monitoring device 132 filters those false target calls from the real target call, that is, the call between the encoded calling telephone number and the receiving telephone number that matched the encoded target data 112. The monitoring device 132 only monitors or records real target calls. False target calls are just routed on to their destination 134 without being monitored by the monitoring device 132.

Thus, for instance, if an unauthorized user accesses the CDR and determines therefrom that a particular call between a calling telephone number and a receiving telephone number was routed differently from the rest of the calling and/or receiving telephone numbers, then the unauthorized user may conclude that these numbers are telephone numbers being monitored by the law enforcement agency. However, because the network element 120 may transfer false target calls to the monitoring device 132, the unauthorized user would not be able to determine with certainty those telephone numbers that the law enforcement agency is interested in monitoring. The one-way encoding algorithm 108a, 108b is non-reversible, that is, once encoded, the target telephone number, the calling telephone number, and the receiving telephone number cannot be decoded, thereby adequately protecting the identity of those telephone numbers that are intended to be monitored by the law enforcement agencies.

Figure 2:
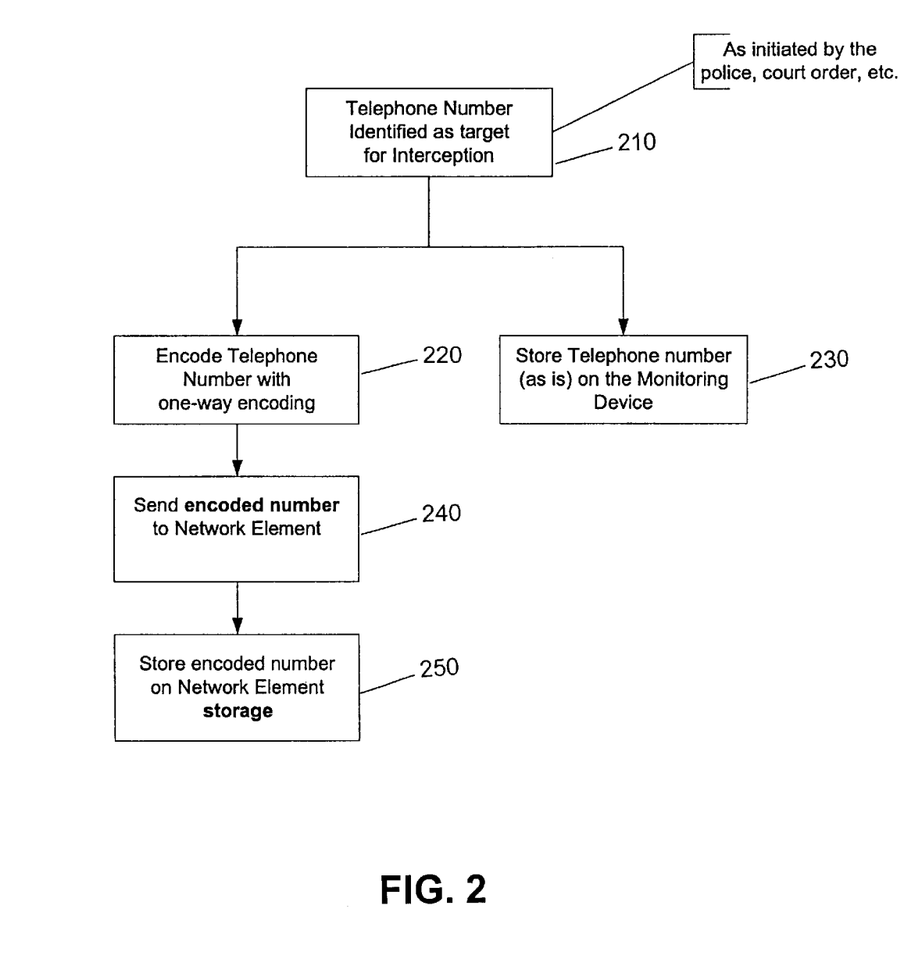
FIG. 2 is a flow chart illustrating a process applying one-way encoding to a target telephone number, in accordance with an exemplary embodiment of the present invention.

FIG. 2 is a flow chart illustrating a process performed the one-way encoding machine 104 to one-way encode a target telephone number, in accordance with an exemplary embodiment of the present invention. At operation 210, a telephone number is identified as a target for interception as initiated by the law enforcement agency such as police, court order, etc. At operation 220, the target telephone number is encoded using the one-way encoding algorithm 108a. At operation 230, the target telephone number is stored prior to encoding in the storage unit 110. At operation 240, the encoded telephone number is transmitted to the network element 120 for further processing. At operation 250, the encoded target telephone number is stored in the storage unit 124 of the network element 120.

Figure 3:
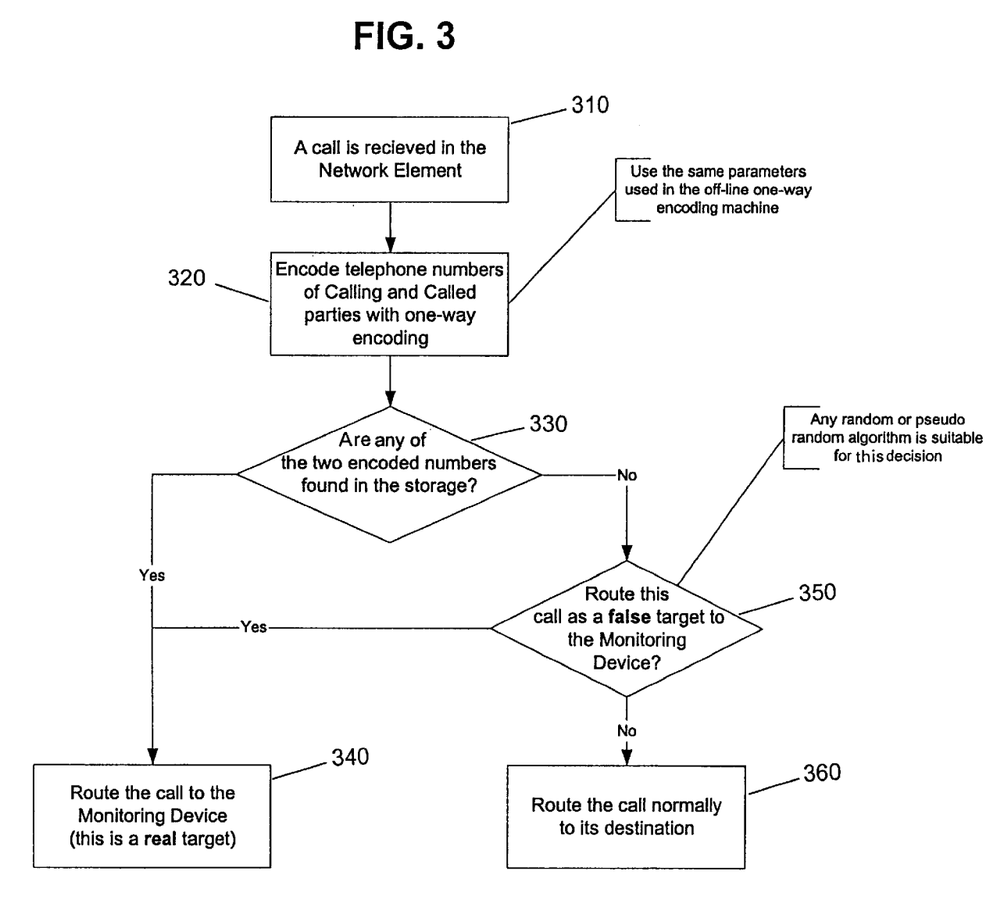
FIG. 3 is a flow chart illustrating a process applying the one-way encoding to a calling telephone number and a receiving telephone number, in accordance with an exemplary embodiment of the present invention.

FIG. 3 is a flow chart illustrating a process performed by the network element 120 to one-way encode the calling telephone number and the receiving telephone number. The process also determines whether the encoded calling and/or the encoded receiving telephone numbers match the encoded target telephone number, in accordance with an exemplary embodiment of the present invention. At operation 310, a call is received at the network element 120. At operation 320, the calling telephone number and the receiving telephone number are encoded using the one-way encoding algorithm 108b. The one-way encoding algorithm 108b encodes the calling and the receiving telephone numbers using the same encoding parameters used by the one-way encoding algorithm 108a to encode the targeted telephone number.

At operation 330, a determination is made as to whether the stored target telephone number matches the encoded calling telephone number and/or the encoded receiving telephone number. If there is a match between the stored target telephone number and the encoded calling and/or the encoded receiving telephone numbers, then at operation 340, the call from the calling telephone number to the receiving telephone number is routed to the monitoring device 132 as a real target call. The monitoring device 132 then connects to other network elements 122 and routes the real target call from the calling telephone number to the receiving telephone number, thereby completing the call.

However, if at operation 330 the process determines that neither the encoded calling nor the encoded receiving telephone numbers match the stored target telephone number, then, at operation 350, a determination is made as to whether to route the call from the calling telephone number to the receiving telephone number to the monitoring device 132 as a false target call. If it is determined to route the call as a false target call, then the process proceeds to operation 340 where the call from the calling telephone number to the receiving telephone number is routed to the monitoring device 132 as a false target call. Otherwise, at operation 360, the network element 120 connects to other network elements 122 and routes the call from the calling telephone number to the receiving telephone number, thereby completing the call.

Figure 4:
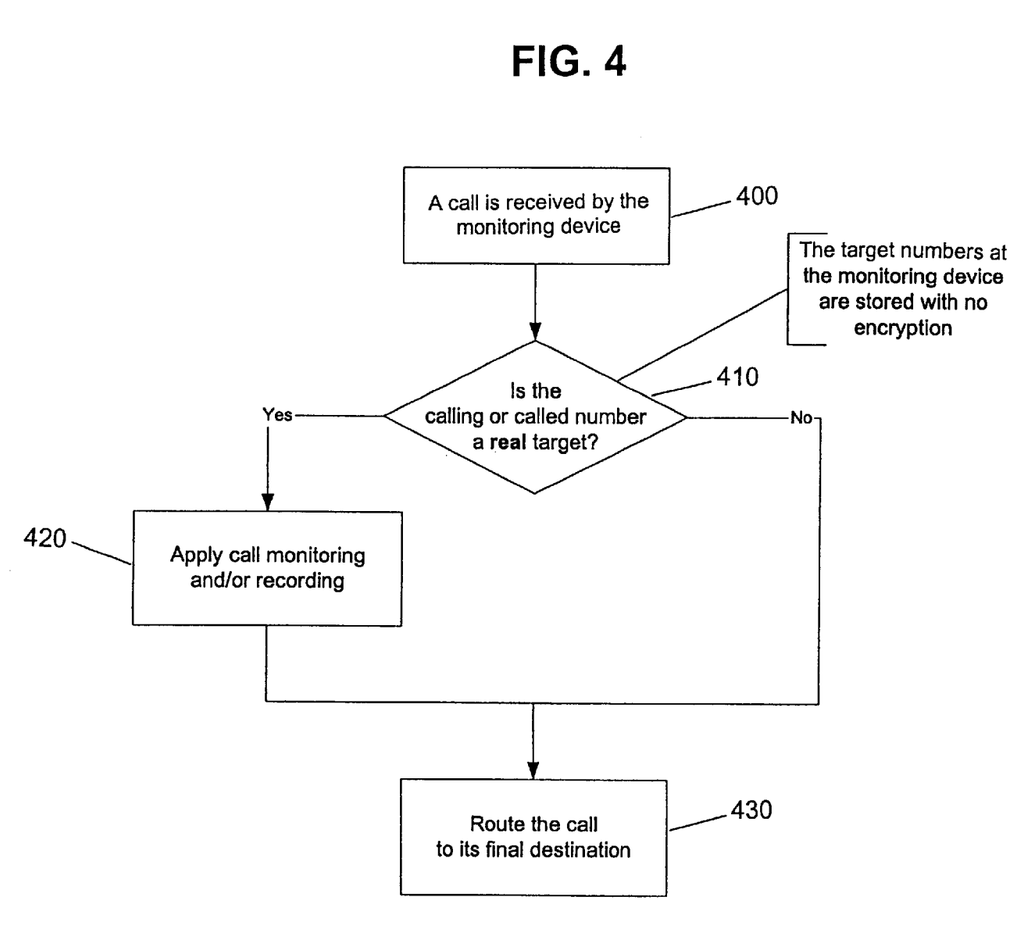
FIG. 4 is a flow chart illustrating a process performed by a monitoring device, in accordance with an exemplary embodiment of the present invention.

FIG. 4 is a flow chart illustrating a process performed by the monitoring device 132, in accordance with an exemplary embodiment of the present invention. At operation 400, the monitoring device 132 receives a call between the calling telephone number and the receiving telephone number. At operation 410, a determination is made whether the call from the calling telephone number to the receiving telephone number is a real target call. At operation 420, if the call from the calling telephone number to the receiving telephone number is a real target call, then the monitoring device 132 monitors and/or records the call. At operation 430, the monitoring device 132 connects to other network elements 134 and routes the call from the calling telephone number to the receiving telephone number thereby completing the call. The monitoring device 132 monitors and/or records the telephone call between the calling telephone number and the receiving telephone number. However, if the calling and/or the receiving telephone numbers do not match the stored target telephone numbers at 410, the monitoring device 132 connects the call to its final destination to other network elements 134 without applying any monitoring or recording to the call.

The many features and advantages of the invention are apparent from the detailed specification and, thus, it is intended by the appended claims to cover all such features and advantages of the invention, which fall within the true spirit, and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

In the claims:

1. A system to protect a target telephone number from unauthorized access, comprising:

a first one-way encoding unit encoding a target telephone number using non-reversible encoding;

a storage unit storing the encoded target telephone number;

a second one-way encoding unit encoding a calling telephone number and a receiving telephone number using the non-reversible encoding;

a monitoring unit; and a comparing unit determining whether the stored encoded target telephone number matches the encoded calling telephone number and/or the receiving telephone number and routing a call between the calling telephone number and the receiving telephone number matching the target telephone number to the monitoring unit, wherein the monitoring unit monitors and/or records the call and connects the calling telephone number to the receiving telephone number.

2. The system as recited in claim 1, wherein the non-reversible encoding in the first one-way encoding unit and the second encoding unit use the same encoding parameters for the target telephone number, the calling telephone number, and the receiving telephone number.

3. The system as recited in claim 1, further comprising a storage unit storing the target telephone number.

4. A system to protect a target telephone number from unauthorized access, comprising:
   a first one-way encoding unit encoding the target telephone number using non-reversible encoding;
   a storage unit storing the encoded target telephone number;
   a second one-way encoding unit encoding a calling telephone number and a receiving telephone number using the non-reversible encoding;
   a monitoring unit; and
   a comparing unit
      comparing the stored encoded target telephone number with the encoded calling telephone number and the receiving telephone number,
      determining therefrom whether the stored encoded target telephone number matches the encoded calling telephone number and/or the encoded receiving telephone number,
      routing a real target call between the calling telephone number and the receiving telephone number matching the target telephone number to the monitoring unit, and
      routing a false target call between the calling telephone number and the receiving telephone number not matching the target telephone number to the monitoring unit,
   wherein the monitoring unit filters the false target call from the real target call and monitors and/or records the real target call.

5. The system as recited in claim 4, further comprising a storage unit storing the target telephone number.

6. A system to protect a target telephone number from unauthorized access, comprising:
   first one-way encoding means for encoding a target telephone number using nonreversible encoding;
   storage means for storing the encoded target telephone number;
   second one-way encoding means for encoding a calling telephone number and a receiving telephone number using the non-reversible encoding;
   monitoring means; and
   comparing means for determining whether the stored encoded target telephone number matches the encoded calling telephone number and/or the receiving telephone number and routing a call between the calling telephone number and the receiving telephone number matching the target telephone number to the monitoring means, wherein the monitoring means monitors and/or records the call and connects the calling telephone number to the receiving telephone number.

7. A system to protect a target telephone number from unauthorized access, comprising:
   first one-way encoding means for encoding the target telephone number using nonreversible encoding;
   storage means for storing the encoded target telephone number;
   second one-way encoding means for encoding a calling telephone number and a receiving telephone number using the non-reversible encoding;
   monitoring means; and
   comparing means for
      comparing the stored encoded target telephone number with the encoded calling telephone number and the receiving telephone number,
      determining therefrom whether the stored encoded target telephone number matches the encoded calling telephone number and/or the encoded receiving telephone number,
      routing a real target call between the calling telephone number and the receiving telephone number matching the target telephone number to the monitoring means, and
      routing a false target call between the calling telephone number and the receiving telephone number not matching the target telephone number to the monitoring means,
   wherein the monitoring means filters the false target call from the real target call and monitors and/or records the real target call.

8. A method to protect a target telephone number from unauthorized access, comprising:
   encoding a target telephone number using non-reversible encoding;
   storing the encoded target telephone number;
   encoding a calling telephone number and a receiving telephone number using the nonreversible encoding;
   determining whether the stored encoded target telephone number matches the encoded calling telephone number and/or the receiving telephone number;
   routing a call between the calling telephone number and the receiving telephone number matching the target telephone number;
   monitoring and/or recording the call; and
   connecting the calling telephone number to the receiving telephone number.

9. A method to protect a target telephone number from unauthorized access, comprising:
   encoding the target telephone number using non-reversible encoding;
   storing the encoded target telephone number;
   encoding a calling telephone number and a receiving telephone number using the nonreversible encoding;
   comparing the stored encoded target telephone number with the encoded calling telephone number and the receiving telephone number and determining therefrom whether the stored encoded target telephone number matches the encoded calling telephone number and/or the encoded receiving telephone number;
   routing a real target call between the calling telephone number and the receiving telephone number matching the target telephone number;
   routing a false target call between the calling telephone number and the receiving telephone number not matching the target telephone number;
   filtering the false target call from the real target call; and
   monitoring and/or recording the real target call.

10. The method as recited in claim 9, further comprising storing the target telephone number.

11. A computer readable storage medium controlling a computer and comprising a process of encoding a target telephone number using non-reversible encoding; storing the encoded target telephone number; encoding a calling telephone number and a receiving telephone number using the non-reversible encoding; determining whether the stored encoded target telephone number matches the encoded calling telephone number and/or the receiving telephone number; routing a call between the calling telephone number and the receiving telephone number matching the target telephone number; monitoring and/or recording the call; and connecting the calling telephone number to the receiving telephone number.

12. A computer readable storage medium controlling a computer and comprising a process of encoding the target telephone number using non-reversible encoding; storing the encoded target telephone number; encoding a calling telephone number and a receiving telephone number using the non-reversible encoding; comparing the stored encoded target telephone number with the encoded calling telephone number and the receiving telephone number and determining therefrom whether the stored encoded target telephone number matches the encoded calling telephone number and/or the encoded receiving telephone number; routing a real target call between the calling telephone number and the receiving telephone number matching the target telephone number; routing a false target call between the calling telephone number and the receiving telephone number not matching the target telephone number; filtering the false target call from the real target call; and monitoring and/or recording the real target call.

\* \* \* \* \*

UNITED STATES PATENT AND TRADEMARK OFFICE
CERTIFICATE OF CORRECTION

PATENT NO. : 6,731,733 B2
DATED : May 4, 2004
INVENTOR(S) : Dan Haran

It is certified that error appears in the above-identified patent and that said Letters Patent is hereby corrected as shown below:

<u>Title page,</u>
Item [57], ABSTRACT,
Line 3, change "nonreversible" to -- non-reversible --.

<u>Column 7,</u>
Lines 40 and 60, "nonreversible" to -- non-reversible --.

<u>Column 8,</u>
Lines 27 and 44, "nonreversible" to -- non-reversible --.

Signed and Sealed this

Second Day of August, 2005

JON W. DUDAS
*Director of the United States Patent and Trademark Office*